United States Patent [19]
Easter et al.

[11] Patent Number: 5,617,311
[45] Date of Patent: Apr. 1, 1997

[54] INFORMATION SYSTEM FOR OPERATING COMPLEX PLANT

[75] Inventors: James R. Easter, Pittsburgh; Albert J. Impink, Jr., Murrysville, both of Pa.

[73] Assignee: Westinghouse Electric Corporation, Pittsburgh, Pa.

[21] Appl. No.: 384,058

[22] Filed: Feb. 6, 1995

[51] Int. Cl.$^6$ ................................................. G05B 9/02
[52] U.S. Cl. ........................... 364/185; 340/525; 376/216; 376/259
[58] Field of Search ................................. 364/184–188, 364/527, 550, 551.01; 340/506–508, 524, 525, 521, 517; 376/215–217, 259; 395/911–915, 185.1

[56] References Cited

U.S. PATENT DOCUMENTS

| | | | |
|---|---|---|---|
| 4,816,208 | 3/1989 | Woods et al. | 376/259 |
| 4,853,175 | 8/1989 | Book, Sr. | 340/525 |
| 5,247,447 | 9/1993 | Korncoff et al. | 364/185 |

OTHER PUBLICATIONS

*Back–fitting a Fully Computerized Alarm System into a Westinghouse PWR: A Progress Report;* by J.R. Easter and L.Lot presented at the Conference on Human Factors and Power Plants, Jun. 8 through 11, 1992, Monterey, CA; Transactions of IEEEE Fifth Conference on Human Factors in Power Plants; pp. 338–341.

*Primary Examiner*—Paul P. Gordon
*Assistant Examiner*—Steven R. Garland

[57] ABSTRACT

An information system for a complex plant which clearly presents to the operator, in parallel as alarms, abnormal process changes which the operator can, at his discretion, manually respond to either to prevent conditions from deteriorating further to the point where automatic protective actuations will be initiated or where automatic protective actuations have not been completed because of a malfunction or were completed but have not been successful. Such alarms are displayed on a dedicated alarm display panel which spatially groups components and subsystems to show appropriate relationships, with the alarm messages shown in the associated area of the display so that possible disturbance propagation can be foreseen. Messages related to uncompleted automatic protective actuations may include a list of faults which prevented completion of those actuations. A separate accomplished action display presents information regarding automatic protective actuations which have been completed together with a confirmation list detailing components and subsystems actuated. The completed automatic protective actuations can be echoed onto the alarm display panel for a limited period of time to alert the operator that the automatic system has responded.

16 Claims, 4 Drawing Sheets

INFORMATION SYSTEM FOR OPERATING COMPLEX PLANT

BACKGROUND OF THE INVENTION

1. Field of the Invention

This invention relates to an information system for assisting an operator in operating a complex plant having automatic controls including controls which automatically initiate protective actions in response to abnormal process changes in the plant. More particularly, it relates to such a system which includes an alarm display which notifies the operator of abnormal process changes for which automatic protective actuations have not been successfully accomplished, and therefore require operator intervention, separately from process changes being effected by automatic protective actuations and displayed on a spatially removed accomplished action display.

2. Background Information

It has been recognized in recent years that the complex technical processes normally encountered in the commercial world can be separated into two categories. In one category fall those processes that, under sufficiently abnormal conditions, could pose a credible threat to the health of the general public because of the presence of various hazardous or potentially hazardous materials in the process facility. The second category contains those processes that do not pose a credible risk to the health and safety of the general public even under severely adverse circumstances by virtue of the absence of significant quantities of hazardous or potentially hazardous materials. Examples of the first category of processes are the primary side of conventional nuclear power plants, which contain significant inventories of radioactive fission and transmutation products, and certain chemical plants where inadvertent operation would yield an easily dispersed toxic gas. In the second category one finds, for example, the secondary side of conventional nuclear power plants, especially pressurized water reactors (PWR's) and typical manufacturing production lines such as automobile assembly lines. Note that the key to distinguishing the two categories for present purposes is threat to the health and safety of the general public, not the threat of financial disaster for the operators or owners of the various processes.

Although automatic control and protection devices are common in most types of complex processes, it has been an essentially universal policy to maintain trained human operators to oversee and, if necessary, to assume direct control of complex processes that fall into the first category noted above. The reasoning behind this practice appears to be that preprogrammed automatic protection devices cannot be guaranteed to drily terminate aberrant processes under all possible conditions and the consequences of failure to terminate the process could be unacceptable in terms of health and safety of the general public. Processes making up the second category do not have the potential to put the health and safety of the general public at risk and so failure of automatic protective devices to terminate an aberrant process is tolerable, apart from the financial consequences. With these thoughts in mind, we may explore in more detail the functions and needs of human operators in relation to complex processes, particularly those that fall in the second category.

Complex processes are frequently designed to be operated in a virtually steady state mode. Inputs and outputs remain essentially constant over significant periods of time and the configuration of components that carry out the process is fixed. Automatic process controllers are utilized to hold process parameters at close to optimum values for the operation being carded on. The fluctuations in the process that result from automatic controller actuation are, by design, minimal. Human operator intervention at this level is negligible and occurs, in principle, only when the process must be shifted from one steady state regime to another.

Since it is recognized that both the components supporting the process and the controllers directing the process are vulnerable, to a non-negligible degree, to malfunction or outright failure, protective devices and mechanisms are provided to limit the propagation of the consequences of component or controller failure to other components supporting the process and, if possible, to the process itself. Protective functions may involve either interruption of part or all of the process or realignment of the process component configuration by component start-up or shutdown or a combination of the two without significant immediate effect on the process itself. The human operator's role with regard to the process protection functions is more active than is his role with regard to the process controllers. He must be aware at all times of both recent and impending changes in the process in terms of cause or potential cause, nature of the change and, if the change has already been initiated, successfulness of the protective actuation. If an automatic change in the process occurs, the human operator will be called upon to restore the process, if interrupted, or to return the process component alignment to its original form, if the alignment is altered, and in any event to initiate repairs to, or replacement of, malfunctioning components. If the process change is impending but has not yet occurred, the human operator may be expected to directly intervene in the process by imposing manual control over that of a malfunctioning automatic controller, for example, to maintain the process or to bring it to an orderly shutdown, before an automatic protective function is activated.

The issue of providing human operators of complex processes with appropriate information regarding the states and trends of the processes they are overseeing or controlling directly has prompted much study and product development, especially in recent years. A significant part of this attention has been directed to the design of alarm management systems whose functions are the identification of process anomalies and the presentation of the information developed to the process operators in an unambiguous way. U.S. Pat. No. 4,816,208 to Woods et al. is representative of relatively recent attempts to define an alarm management system that is particularly designed to support the human operators of complex process in the first category in directly controlling and terminating an aberrant process that has not responded to automatic protection system actuations. While the approach described appears as though it would be effective in the intended application, it does not appear to be suitable for supporting human operators of processes in the second category, or in the first category for that matter, where the operator's role is more nearly one of overseeing the workings of the automatic protection systems than of directly controlling the process.

There is a need for an information system for assisting operators in the operation of plants of the second category which makes the operator aware of a situation in which he cannot rely upon the automatic protection system and will have to, or advantageously can, intervene. These include situations where the automatic protection system itself experiences a malfunction and therefore does not accomplish the required protective actuations, and those situations in which although the protection system performs as designed, it is inadequate to address the situation. There is also a need for a system which will notify the operator of abnormal process changes which precede actuation of the automatic protection system so that the operator may have the opportunity to intervene if desired to avoid the need for the automatic system to take corrective action, especially considering that the corrective action might include shut down of the plant. There is an additional need for such a system which makes available to the operator information regarding successful operation of the automatic protection systems. This information should be presented separately from the information on unsuccessful operation of the protection system so that the operator is clearly apprised of the situations where intervention will be likely to be required. There is also a need for making the operator aware of the failures in the automatic protection system. There is an additional need for making the operator aware of conditions which have been corrected.

SUMMARY OF THE INVENTION

These and other needs are satisfied by the invention which is directed to an information system for a complex plant which clearly and distinctly makes available to the operator information regarding automatic protective actuations which have been unsuccessful. This includes automatic protective actuations which were not completed because of a malfunction in the automatic system. Preferably, the faults which caused the automatic protective actuation to be incomplete are displayed to the operator. The information system also separately makes available to the operator information regarding automatic protective actuations which have been successfully accomplished.

More particularly, the invention is directed to an information system for a complex plant which includes alarm display means displaying information regarding uncompleted automatic protective actuations and a separate accomplished action display means which displays information regarding the recently accomplished automatic protective actuations. In its preferred form, the alarm display means identifies the certain abnormal process changes which should have initiated the automatic protective actuation in order to identify those automatic protective actuations which were unsuccessful. Also preferably, the alarm display means displays a list of the faults which resulted in the unsuccessful automatic protective actuation.

The alarm display means also displays abnormal process changes which are precursors to process changes which will initiate automatic protective actuations. This allows the operator to take steps to avoid the deterioration of conditions to the point where automatic protective actuations are necessary.

As mentioned, abnormal process conditions which have initiated automatic protective actuations which have been completed are displayed on the accomplished action display means. However, even though the protective actuations were successfully completed, it is possible that that action will not be successful in correcting the abnormal process change. Thus, if the automatic protective actuations are completed, but are unsuccessful in correcting the abnormal process change, the abnormal process change is removed from the accomplished action display and is displayed by the alarm display means as an unsuccessful automatic protective actuation, so that again, the operator may take other measures to correct the situation.

The accomplished action display means displays with the completed automatic protective actuations a confirmation list identifying the components which were actuated. This display also provides information regarding the establishment of predetermined normal conditions in response to the automatic protective actuation.

In addition, abnormal process conditions which initiate a subsequently completed automatic protective actuation can be echoed on the alarm display means to provide the operator with an indication of successful actuation. This echo is removed from the alarm display means after a predetermined time interval. Successful actuations are echoed on the alarm display means because the operator may not be referencing the accomplished action display means. Preferably, the alarm display is arranged to illustrate process flow through the components of the complex plant, so that the operator can gain an appreciation of how an abnormal process change in one area may affect other areas of the process flow. The abnormal process conditions are displayed in association with a disturbed process or component which is represented by a specific area on the display. The information is displayed in parallel, but can be prioritized if all of the information can not be displayed simultaneously. On the other hand, the accomplished action display means, presents the information displayed in serial format.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to the secondary side of a pressurized water reactor (PWR) nuclear power plant system; however, it will be evident to those skilled in the art that the invention has application to other complex plants.

Figure 1:
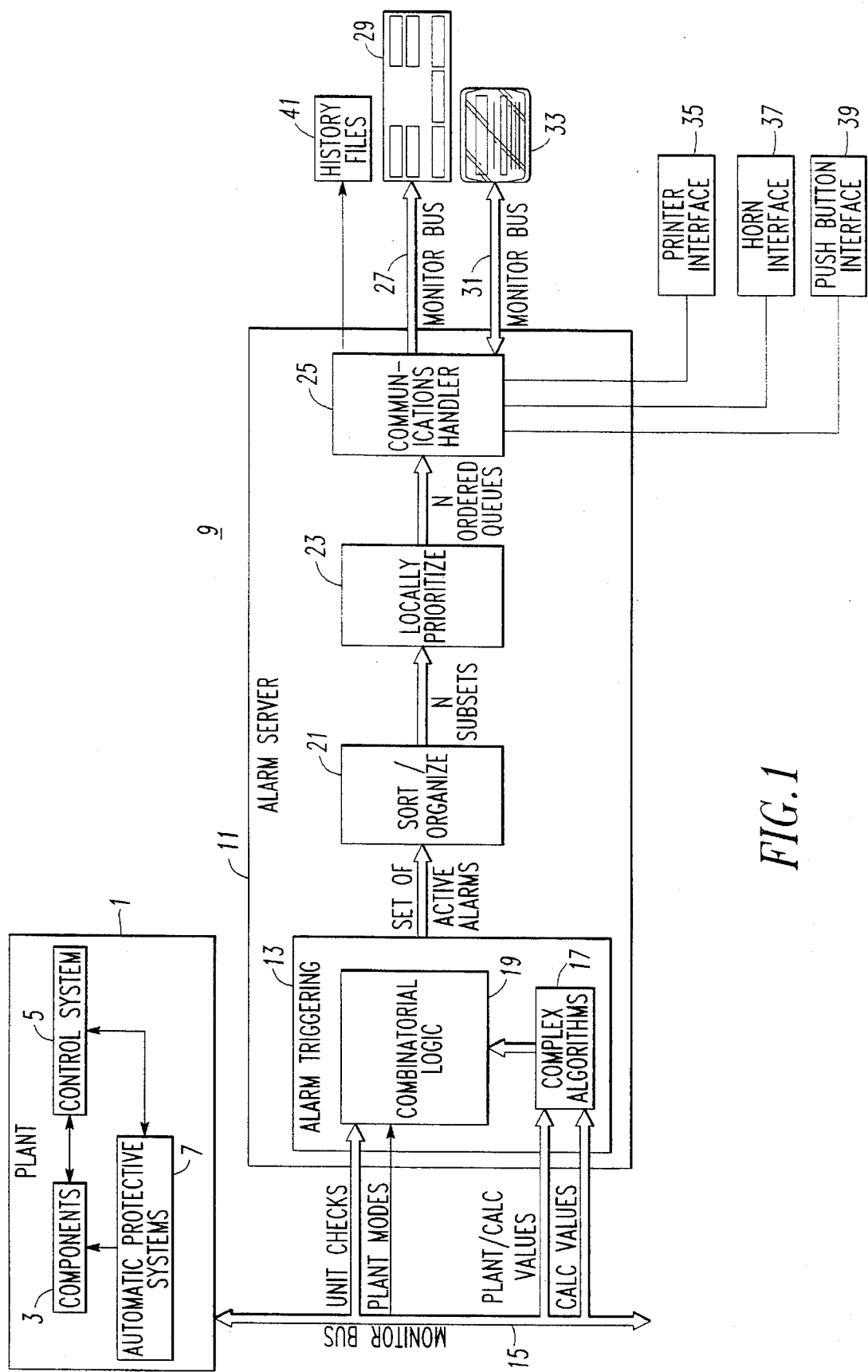
FIG. 1 is a schematic diagram of an information system in accordance with the invention.

Referring to FIG. 1, a complex plant 1 such as a PWR has a number of components 3 arranged to produce a process flow. An automatic control system 5 controls the components 3 to produce the desired process flow. Controllers (not shown) within the automatic control system operate the components to maintain various measured process variables within specified ranges as is well known. Should some of the components 3 or pans of the control system 5 fail so that process conditions exceed specified ranges, an automatic protection system 7 automatically makes protective actuations designed to provide alternative operation of the plant or to mitigate damaging effects of the malfunction. These automatic control actuations therefore can include such things as turning on an alternative pump or adjusting a valve to provide an alternative flow path which will return the process variables to their normal ranges of operations. Where this can not be accomplished, the automatic protective system typically shuts the plant down in a safe condition. As discussed above, malfunctions among the components 3 or the control system 5 can result in abnormal process changes which are beyond the capability of the control system to remedy. Ordinarily, the automatic protective system 7 will respond to these abnormal process changes and effect changes in the plant which will bring the process variables back within the desired ranges or to an acceptable shutdown state. These automatic protective actuations do not require any input on the part of the operator. However, there can be situations where the automatic protective system experiences a malfunction, or the abnormal process change is one which cannot be accommodated by the automatic protection system 7. The present invention is particularly designed to assist the operator in this latter case by identifying the abnormal process changes which are not being addressed by the automatic protective system, either because of a malfunction in the automatic protective system or because the automatic protection system although operating as designed is incapable of overcoming a particular abnormal process change.

The information system 9 of the invention is implemented using the software organized by an alarm server 11. The software includes an alarm triggering module 13 which communicates with the plant 1 through a monitor bus 15. The alarm system is provided with sensor data from the plant 1 identified with plant value and calculated values generated by the plant control systems. The alarm triggering module includes complex algorithms 17 which utilize various combinations of plant/calculated values and calculated values received from other calculational devices in a computer network to generate values of desired plant conditions. These complex algorithms can include, for example, in the case of the PWR, the calculation of saturation temperatures and departure from nucleate boiling. The results of implementation of these complex algorithms is utilized by combinatorial logic 19 along with unit checks applied to unit conversions of directly measured plant variables to generate complex multi-variable alarm triggers. Alarms are only generated in response to abnormal process changes. The set of active alarms generated by the alarm triggering module 13 is then sorted and organized by category by the sort/ organize module 21. This produces subset of alarms organized by category. These N subsets of alarms are then locally prioritized within each category in the prioritize module 23 to produce one or more ordered queues for each category. The alarms are organized in this manner because as will be seen, they are presented on a display panel in association with the arrangement of categories within the plant. While alarm messages are displayed in parallel, it is possible that more messages affecting a particular portion of the plant may be generated than can be displayed in parallel. In that case, the messages with the highest priority are displayed for attention by the operator.

The N ordered queues of alarms are then passed to a communications handler 25 which assembles the precise message wording for each alarm message and formats a message for transmittal over a monitor bus 27 to an alarm display panel 29 or over a bus 31 to an accomplished action display device 33. The communication module also can provide the alarm messages to a printer interface 35 for printout of a hard copy of the alarm messages. The communications handler 25 also drives a horn interface 37 for providing an audible signal to the operator, and receives push button responses by the operator, for instance acknowledging an alarm, through a push button interface 39. In addition, the communication handler 25 can transmit the alarm messages to history files 41 for generating a permanent historical record.

The alarm display panel is preferably a large wall display in the plant control room. Additional alarm displays can be provided in other locations.

Figure 2A:
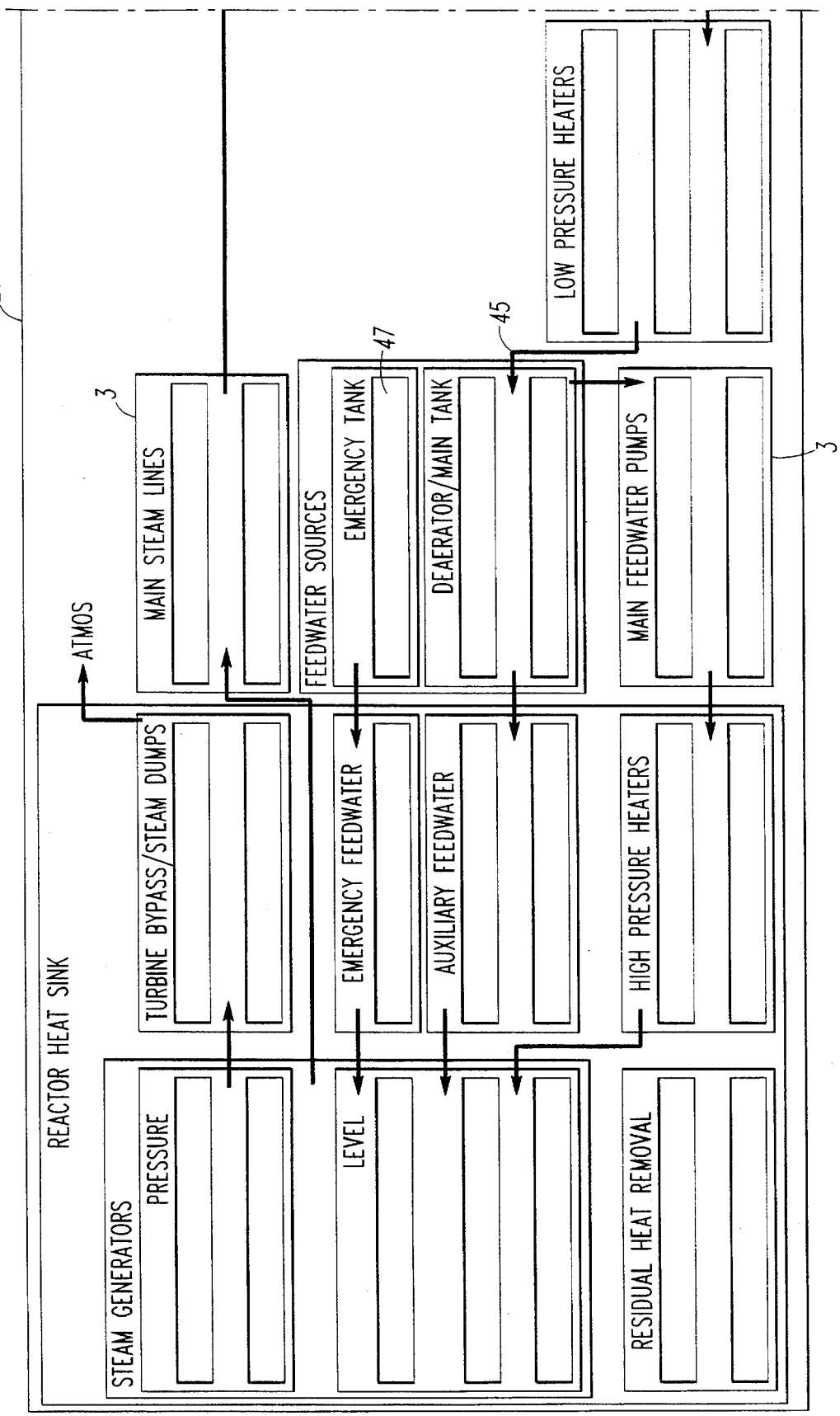
FIGS. 2A and B when placed side by side illustrate a portion of an exemplary alarm display panel in accordance with the invention.
Figure 2B:
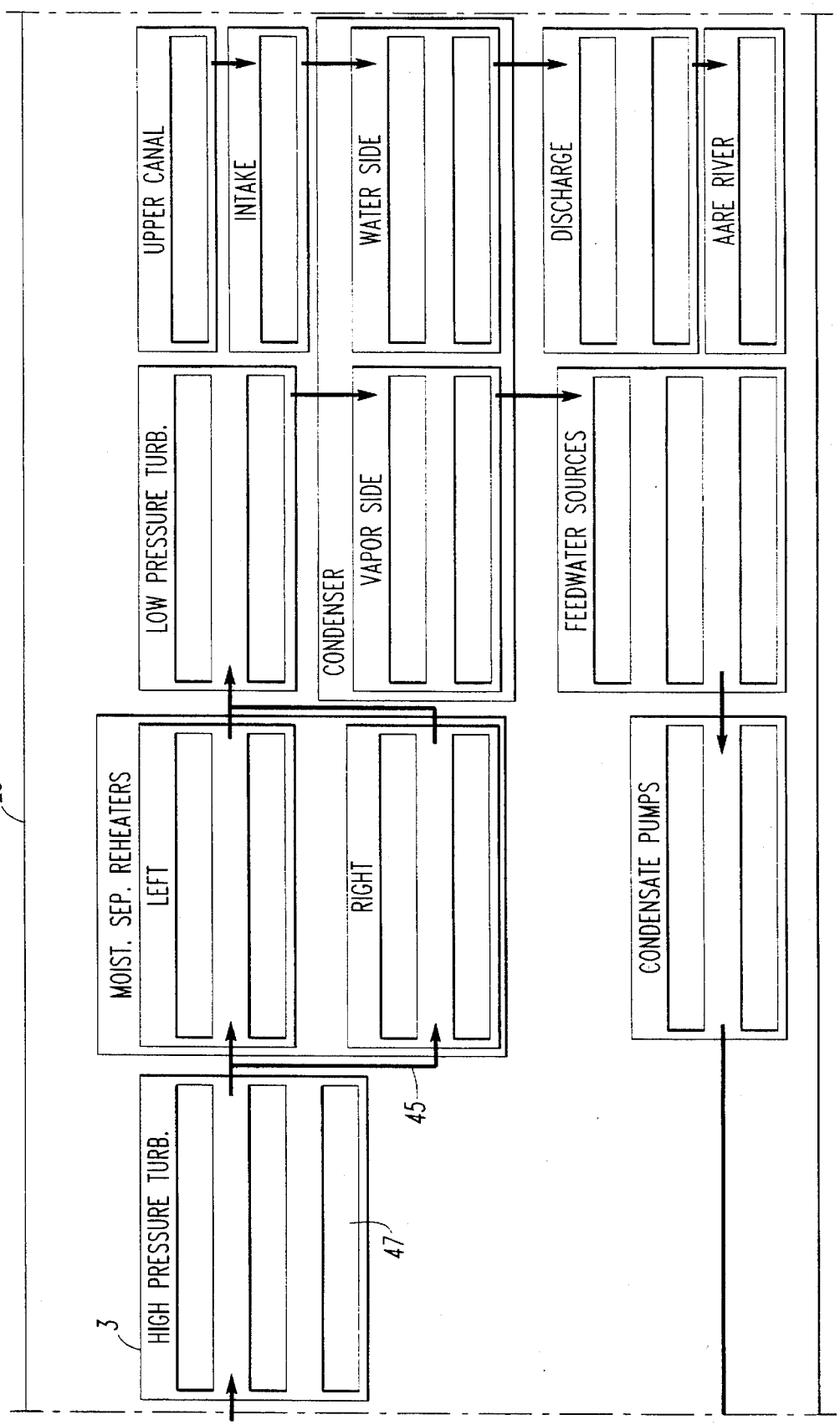

An example of a portion of an alarm display panel 29 is illustrated in FIG. 2. The exemplary display in FIG. 2 is for the reactor heat sink of a PWR. The display includes representations 43 of the components 3 of the particular part of the plant arranged to show process flow as represented by the arrows 45. The component representations 43 are labeled to clearly identify the respective components 3. In the particular example, the arrows 45 illustrate the flow of feedwater, steam and condensate in the secondary side of the PWR. Other sections of the alarm display panel represent other portions (not shown) of the plant 1 in a similar manner. Associated with each of the representations 43 of the relevant plant components 3 are message display devices 47 which visually display alarm messages associated with that component. In the exemplary case, fluorescent luminescent information panels (FLIPs) are used for the message display devices 47. Other types of devices, such as larger devices which can display multiple messages or pixel graphic display devices can be used in place of the FLIPS 47. Furthermore, different background colors can be used in addition to the permanent captions to help the operator to quickly identify in which plant or process area an abnormality has been detected. Wording of the messages displayed reinforces identification of the affected area. Spacial proximity and the flow paths indicated by the arrows 45 allow rapid assessment of likely paths of disturbance propagation.

With the exception of the "echo" messages which will be explained below, all the alarm messages displayed on the alarm panel 29 remain on the display as long as the respective message trigger logic expressions evaluate TRUE, unless superseded by higher priority messages. Valid messages of lower priority assigned to a given display device 47 are stacked in a queue for display when the display device becomes available. These lower priority messages can be serially viewed on a separate screen alternative to the accomplished action display on the device 33.

The accomplished action display 33 differs both materially and in intent from the alarm display 29. While the alarm display 29 is in parallel form with all currently valid alarm messages of sufficiently high priority in view at the same time, the accomplished action display 33 can readily be in serial form with only a few of the currently valid accomplished action messages in view at any given time on a suitable display device. The intent of the alarm display 29 is to give the operator an overview of existing abnormalities and process changes at all points in a complex process; the intent of the "accomplished action" display 33 is to allow the operator to confirm, if he wishes to, that protective process changes have occurred in the recent past when and as intended. As a result, the format of the "accomplished action" display 33 need not be as rigorously defined as that of the "alarm" display 29. An acceptable format is, for example, a repeat of the layout of the "alarm" display 29 imbedded in a computer memory with the currently valid accomplished action messages in place. Provisions in the computer software would allow viewing a small section of the entire display on a computer terminal screen and would permit the operator to view any one section of the entire display at his request.

The primary purpose of the alarm display 29 is to bring to the operator's attention abnormal process changes which do or may require his intervention. The principal alarms displayed on the alarm display 29 provide information regarding automatic protective actuations which were not successful due, for instance, to malfunctions of the automatic protective actuation systems. This could include for instance failure of a pump or valve to operate or failure of a sensor. The automatic protective actuations are typically only utilized for certain abnormal process changes. In many instances, there can be initial abnormal process changes, that is process changes which cause parameters to go out of normal ranges, but which do not trigger an automatic protective actuation. In the preferred embodiment of the invention, these initial abnormal process changes are also presented to the operator on the alarm panel 29, so that the operator may at his or her discretion take action such as would preclude conditions deteriorating to the point where an automatic protective actuation were would be triggered. If plant operation deviates outside of normal conditions resulting in an initial abnormal process change, an appropriate message is presented to the operator on the alarm display panel 29. If conditions deteriorate further to produce a certain abnormal process condition which triggers an automatic protective actuation, and that automatic protective actuation is successfully carried out, no alarm message appears on the alarm display panel 29. The completed automatic protective actuation is displayed on the accomplished action display 33. As this is the secondary display device, the operator may not notice that the automatic protective actuation has been triggered and accomplished. As an optional feature of the present invention, the abnormal process change which triggered the accomplished protective actuation is echoed on the alarm panel display 29 for a predetermined interval of time, such as for instance 5 or 10 minutes. This clearly brings to the operator's attention that the automatic protective actuation has been successfully accomplished. However, it is possible that even though the automatic protective actuation operates as designed, it may not be successful in correcting the abnormal process change. In accordance with the invention, if an accomplished automatic protective actuation does not correct for the abnormal process change which triggered it within a prescribed period of time the actuation is considered unsuccessful and a new alarm is triggered on the alarm display panel 29.

As another aspect of the invention the alarm display panel also presents to the operator on the display device 43 a message which includes a list of faults which caused the automatic protective actuation to be incomplete. For instance, a pump which did not turn on or a valve which did not open can be identified.

As mentioned, the accomplished action display 33 presents information regarding automatic protective actuations which were successfully accomplished. These messages are serially listed chronologically and can be removed from the display after a preselected period of time, for instance, 5 or 10 minutes. The accomplished action display 33 also presents messages which indicate that a process change has occurred, for instance, in response to an automatic protective actuation or to operator intervention, to bring the process back within the predetermined normal operating conditions. Thus, if a pressure went low, generating a low pressure message, and corrective action returned the pressure to normal, a message such as "pressure normal" can be generated. The accomplished action display 33 also displays confirmation lists indicating what components were actuated to successfully accomplish an automatic protective actuation.

Figure 3:
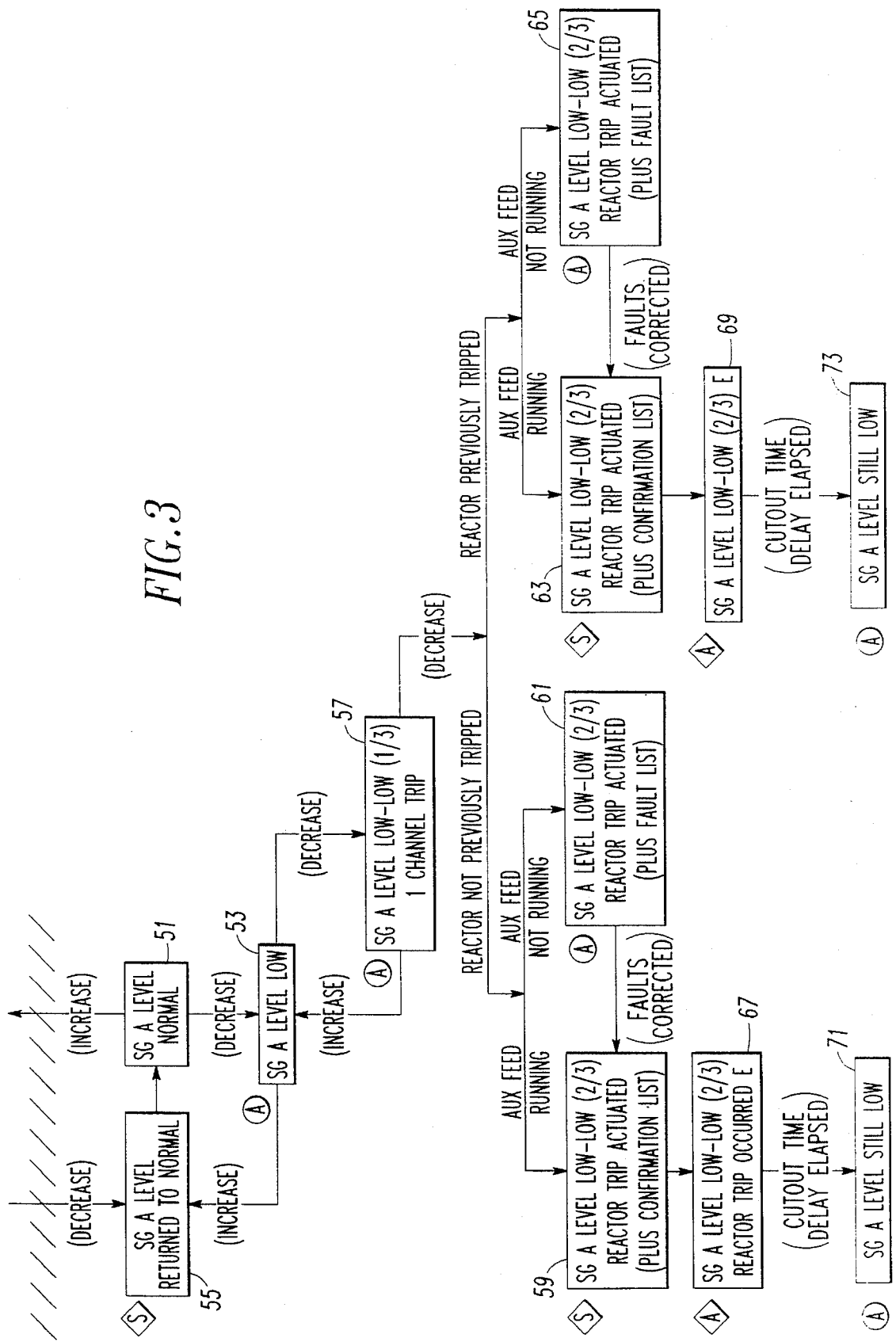
FIG. 3 is a flow diagram illustrating a message sequence related to a process variable degradation in accordance with the invention.

FIG. 3 illustrates a flow diagram for various possible message sequences that could occur as a process variable changes over a period of time. The exemplary process variable is the fluid level in steam generator SG A. On this diagram, messages which appear on the alarm display panel 29 are identified by the letter "A" within a circle. Such messages are only cleared by a change in state. Messages which appear on the accomplished action display 33 and represent a change in status are identified by the letter "S" within a diamond. These messages are cleared either by a time-out or a change in state. An alarm message on the alarm display panel 29 which is an echo of a corresponding message on the accomplished action display 33 is identified by the letter "A" within a diamond. Such messages are cleared by a time-out. Changes in the sensed variable are represented in FIG. 3 by solid lines with an arrow. Alternative paths and supporting logic are represented by the broken lines with an arrow. The sequence begins from the condition SG A Level NORMAL indicated at 51 in the upper left of FIG. 3. Steam generator A Level Normal is a normal process condition and so would not produce a message on either the alarm display panel 29 or the accomplished action display 33. Were the level indication to decrease below a defined set point, an "SG A Level" ALARM would be generated at 53 and displayed in the steam generator level area of the alarm display panel 29 as a warning to the operator that an automatic protection actuation is impending. At this point, the operator could, if he chose, intervene in the process to restore steam generator level. If the operator did intervene and the intervention was successful, the steam generator level would increase above the LOW set point and an accomplished action message reporting "SG A Level RETURNED TO NORMAL" would appear for a preset number of minutes on the accomplished action display 33. The trigger logic expression that initiated the level LOW alarm would consequently no longer be TRUE and the message would disappear from the alarm display panel 290

If the operator did not, or could not, intervene in the process and the level continued to decrease, the most sensitive of the three LOW–LOW level protection channels would eventually indicate LOW–LOW level and a "SG A Level LOW–LOW (⅓); 1 CHANNEL TRIP" alarm would be generated at 57 and displayed on the alarm display panel 29 in the Steam Generator Level area. Concurrently, a LOW–LOW Level Exclusion element in the Level LOW trigger logic expression (to be explained below) would make the expression no longer TRUE and the Level LOW message would be superseded and would disappear.

With a further decrease in the steam generator level, the second LOW–LOW Level protection channel would indicate LOW–LOW Level and a Reactor Trip would be initiated. The single channel LOW–LOW message would be superseded and one of four messages would appear depending upon current plant conditions and on the responses of process components. The trigger logic expression for each message contains an applicability element relating to whether the reactor had already been tripped for another reason prior to the level LOW–LOW (⅔) actuation. Each message's trigger logic expression also contains a contingent conditions element relating to whether an acceptable combination of running auxiliary feed water pumps and open cross-over valves was automatically established to supply feed water to the generators to restore level. The message whose trigger logic expression evaluates TRUE would appear in the steam generator level area of the appropriate display together with one or more of the supplementary messages either listing failures of process components to achieve the proper alignment (Fault List on the alarm display panel 29) or confirming that the process components achieved an acceptable alignment (Confirmation List on the accomplished action display 33.)

Thus, if the reactor had not previously been tripped and auxiliary feedwater is being supplied and is therefore in the process of restoring the steam generator level, the message "SG A Level LOW–LOW (⅔); Reactor Trip ACTUATED" plus a Confirmation List listing the components that were actuated such as the auxiliary feed pump is generated at 59. This message appears on the accomplished action display 33 as the automatic protective action was completed. If auxiliary feedwater was not being supplied, the message "SC A Level LOW–LOW (⅔); Reactor Trip ACTUATED" plus a Fault List listing the components which failed to actuate such as the auxiliary feed pump is generated on the alarm display panel 29 at 61. If the reactor had been previously tripped and auxiliary feedwater is being supplied, the message "SG A Level LOW–LOW (⅔)" plus a Confirmation List is generated at 63 on the accomplished action display 33. If the reactor had been previously tripped and the auxiliary feedwater is not being supplied, the message "SG A Level LOW–LOW (⅔)" plus a Fault List is generated at 65 on the alarm display panel 29.

If subsequently, a component misalignment which had initially existed was then corrected by operator intervention, the alarm trigger logic expression would no longer be TRUE and that message would disappear. Instead the trigger logic expression for the corresponding accomplished action message would now evaluate TRUE and the appropriate message with its supporting Confirmation List would appear on the accomplished action display. Thus, for instance, if the message 65 were displayed on the alarm display panel 29 and the fault which generated the message were to be overcome, that message 65 would disappear from the alarm display panel 29 and the message 63 with the accompanying confirmation list would appear on the accomplished action display 33. Similarly, the message 59 on the accomplished action display 33 would replace the message 61 on the alarm display panel 29 if the fault were to be corrected.

If the progression eventually places one of the two "SG A Level LOW-LOW (⅔)" messages 59 or 63 with the associated Confirmation List on the accomplished action display 33, an echo 67 or 69 of the primary message will appear for a short interval of time in the steam generator level area of the display panel 29, disappearing when the accomplished action message disappears. When the displayed messages disappear, a timer is started and if Steam Generator Level remains LOW–LOW for a longer time than would be expected following a reactor trip, an alarm message "SG A Level STILL LOW–LOW" is generated at 71 or 73 and displayed on the alarm display panel 29 to warn the operator that although the desired process changes were accomplished, process conditions are still abnormal.

Tables 1 and 2 below show representative samples of the actual message text that would appear on the alarm display panel 29 and the accomplished action display 33, respectively, during the course of the progression shown in FIG. 3. The first two examples and the last example of the alarm display messages are, effectively, in a single line format and convey a single piece of information. The third and fourth examples consist of a primary message with at least one supplementary message describing some aspect of an automatic protection function that was not successfully completed. Note that these messages relate to aspects of the automatic process change that are in addition to the basic reactor trip process change. The set of supplementary messages displayed is referred to as a "Fault List." Examples 5 and 6 are echoes of primary messages displayed on the accomplished action display and are so indicated by a single upper case letter "E" at the end of the message text.

The first example shown for the accomplished action display 33 is again in single line format. The second and third examples consist of a primary message plus a set of supplementary messages regarding various aspects of the successfully completed automatic process change and referred to as "Confirmation List". In these two cases, the automatic process change could result in either of two acceptable component alignments, hence the reference to "alternatives".

TABLE 1

"ALARM" DISPLAY MESSAGES

| | | |
|---|---|---|
| | 1. | Steam Generator A (JRC-13A) Narrow Range Level LOW |
| | 2. | Steam Generator A (JRC-13A) Narrow Range Level LOW-LOW (½); Single Channel TRIP |
| | 3. | Steam Generator A (JRC-13A) Narrow Range Level LOW-LOW (⅔); Reactor Trip ACTUATED |
| | | (either) |
| | | Auxiliary Feedwater Pumps 1 and 2 (LSN-1 and LSN-2) BOTH NOT RUNNING |
| | | (or) |
| | | Auxiliary Feedwater Pump 2 (LSN-2) NOT RUNNING |
| | | Auxiliary Feedwater Pump 1 (LSN-1) RUNNING |
| | | (as appropriate) |
| Possible Fault List Members | | Auxiliary Feed Cross Connection Valve (6788-A) NOT OPEN |
| | | (and/or) |
| | | Auxiliary Feed Cross Connection Valve (6788-B) NOT OPEN |
| | | (and/or) |
| | | Auxiliary Feedwater Control Valve (LCV-488C) NOT OPEN |
| | 4. | Steam Generator A (JRC- 13) Narrow Range Level LOW-LOW (⅔) |
| | | (either) |
| | | Auxiliary Feedwater Pumps 1 and 2 (LSN-1 and LSN-2) BOTH NOT RUNNING |
| | | (or) |
| | | Auxiliary Feedwater Pump 2 (LSN-2) NOT RUNNING |
| Possible Fault List Members | | Auxiliary Feedwater Pump 1 (LSN-1) RUNNING |
| | | (as appropriate) |
| | | Auxiliary Feed Cross Connection Valve (6788-A) NOT OPEN |
| | | (and/or) |
| | | Auxiliary Feed Cross Connection Valve (6788-B) NOT OPEN |
| | | (and/or) |

TABLE 1-continued

"ALARM" DISPLAY MESSAGES

|   |   |
|---|---|
|   | Auxiliary Feedwater Control Valve (LCV-488C) NOT OPEN |
| 5. | Steam Generator A (JRC-13A) Narrow Range Level LOW-LOW (⅔); Reactor Trip ACTUATED E |
| 6. | Steam Generator A (JRC-13A) Narrow Range Level LOW-LOW (⅔) E |
| 7. | Steam Generator A (JRC-13A) Narrow Range Level STILL LOW-LOW |

TABLE 2

"ACCOMPLISHED ACTION" DISPLAY MESSAGES

|   |   |   |
|---|---|---|
|   | 1. | Steam Generator A (JRC-13A) Level RETURNED TO NORMAL |
|   | 2. | Steam Generator A (JRC-13A) Narrow Range Level LOW-LOW (⅔); Reactor Trip ACTUATED (either) |
| Confirmation List Alternatives |   | Auxiliary Feedwater Pump 2 (LSN-2) RUNNING (or) Auxiliary Feedwater Pump 2 (LSN-2) NOT RUNNING Auxiliary Feedwater Pump 1 (LSN-1) RUNNING Auxiliary Feed Cross Connection Valves (6788-A and 6788-B) BOTH OPEN (and) Auxiliary Feedwater Control Valve (LCV-488C) OPEN |
|   | 3. | Steam Generator A (JRC-13A) Narrow Range Level LOW-LOW (⅔) (either) |
| Configuration List Alternatives |   | Auxiliary Feedwater Pump 2 (LSN-2) RUNNING (or) Auxiliary Feedwater Pump 2 (LSN-2) NOT RUNNING Auxiliary Feedwater Pump 1 (LSN-1) RUNNING (or) Auxiliary Feed Cross Connection Valves (6788-A and 6788-B) BOTH OPEN (and) Auxiliary Feedwater Control Valve (LCV-488C) OPEN |

If appropriate, a Fault List of messages summarizing unsuccessfully completed aspects of the interruptive process change "Reactor Trip" will appear in a dedicated area of the alarm display panel 29. If all aspects of the "Reactor Trip" are successfully completed, a Confirmation List to that effect appears in a dedicated area of the accomplished action display 33.

In the preferred form of the invention each message comprises a message package which includes a combination of individual entries from various files that together result in the appearance of one "fine" of information at a specified point on a specified display. A message package consists of:

the message name;

the trigger logic expression;

the message text;

the message location on the appropriate display; and the message priority at the specified location.

The message name specifies the locations in the various data files at which the various components of the message package are stored. The trigger logic expression is effectively a Boolean logic expression which describes a specified relationship among the logical states of a set of digital inputs derived from plant data inputs. If each of the inputs is in the intended logical state, the expression will evaluate "TRUE" and will cause the corresponding message text to be directed to the intended location on the appropriate display. The message text is the string of characters which spells out the information to be conveyed to the operator when the trigger logic is satisfied. The message location is the particular display device in the specified field on the alarm display panel or the accomplished action display, as appropriate, to which the message character string will be directed and in which it will eventually appear. Since a number of related messages may be directed to the same message location, message priorities are assigned. If two or more message texts are directed to a given message location at the same time, the text with the highest priority will be displayed. When the trigger logic for the highest priority message is no longer satisfied, its text disappears and the text of the next highest priority message appears in the same field. A special character in each message text field in the alarm display informs the operator that a lower priority message is stacked behind the display message in that field.

A trigger logic expression may consist of four elements. These are:

1. Initiator—the element of the trigger logic expression that describes the aberrant condition that motivates the generation and display of a given message. The initiator element is present in every trigger logic expression and is usually reflected in the first part of the corresponding message text.

2. Applicability—to describe the condition(s) under which a given message is meaningful. Thus, an alarm indicating that steam generator level is LOW–LOW when the reactor head has been removed for refueling is not meaningful and is suppressed by a "not during cold shut-down" element.

3. Exclusions—to describe conditions under which a valid message is not presented. Thus, an alarm indicating steam generator level is LOW is superseded by a valid message that steam generator level is LOW–LOW;

4. Contingent Conditions—in cases in which process changes are involved, contingent conditions elements are included in the corresponding trigger logic expressions. The contingent conditions test whether the required process changes have actually been accomplished and, therefore, whether the message is an accomplished action or a true alarm.

As an example of a trigger logic expression consider the message "SG A Level LOW–LOW (2/3)" message 65 shown in FIG. 3. The logic expression is as follows:

(1) at least two indications of LOW SGA level among LC480 A/B, LC481 A/B, and LC 482 A/B; and (2) not RHR conditions; and (3) no level 1 or level 2 First Out on LOW-LOW SGA level; and (4) either no any feed pumps running or aux feed pump 2 not running, pump 1 running and cross-connection not open or auxiliary feedwater control valve not open.

The first portion (1) of the logic expression is the initiator element which requires that at least two of the identified LOW–LOW level sensors detect a LOW–LOW level in the steam generator. The second portion (2) in the logic description for this message is the applicability element. The logic expression can only have a TRUE value if conditions do not exist for the residual heat removal system to be operating. This would be indicated by a reactor coolant system pressure above the level at which the RHR could operate. The third portion (3) is the exclusion element which indicates that the reactor was not previously tripped on a SG-A LOW–LOW level. The final section (4) of the logic description is the contingency element which in this case indicates that the automatic protection actuation was not successful either because no auxiliary feed pumps are running, or auxiliary feed pump 2 is not running and auxiliary feed pump 1 is running instead but the cross-connection which would allow feed pump number 1 to direct feed water to steam generator SGA is not opened, or because the auxiliary feedwater control valve is not open.

The present invention provides an information system which assists an operator of a complex plant by clearly presenting to him situations in which he can at his discretion manually take control of the process either to prevent conditions from worsening to the point where automatic protective action will be initiated or where automatic protective actuations were unsuccessful in putting the plant in a stable state. At the same time the operator is apprised of successfully accomplished automatic protective actuation, but in a manner which clearly distinguishes them from the above alarm conditions.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An information system for operating a complex plant, said system comprising:

alarm display means displaying in parallel, information regarding an unsuccessful automatic protective actuation initiated in response to certain abnormal process changes; and accomplished action display means displaying separately from said alarm display means, information regarding another, recently completed automatic protective actuation.

2. The system of claim 1 wherein said alarm display means includes means for displaying said certain abnormal process changes as said information regarding unsuccessful automatic protective actuation.

3. The system of claim 2 wherein said alarm display means includes means for displaying a list of component failures causing an unsuccessful automatic protective actuation as part of said information regarding unsuccessful automatic protective actuation.

4. The system of claim 2 wherein said alarm display means further includes means for displaying initial abnormal process changes which do not initiate automatic protective actuation but which if unchecked lead to said certain abnormal process changes.

5. The system of claim 2 wherein said accomplished action display means comprises means for displaying said certain abnormal process changes which initiated said recently completed automatic protective actuation as said information regarding said recently completed automatic protective actuation.

6. The system of claim 5 wherein said accomplished action display means comprises means displaying said certain abnormal process changes which initiated said recently completed automatic protective actuation serially.

7. The system of claim 5 wherein said accomplished action display means comprises means displaying with each certain abnormal process change a confirmation list listing actuations which were completed by the completed automatic protective actuation.

8. The system of claim 5 wherein said accomplished action display means further includes means displaying information regarding recent process changes establishing predetermined normal process conditions following an abnormal process change.

9. The system of claim 5 wherein said alarm display means further comprises echo means for displaying on said alarm display for a predetermined timeperiod an echo of said certain abnormal process change which initiated said recently completed automatic protective actuation displayed on said accomplished action display means with identification as an echo.

10. The system of claim 5 wherein said alarm display means further includes means for displaying as an indication of an unsuccessful automatic protective actuation, a certain abnormal process change previously displayed on said accomplished action display means as having initiated a completed automatic protective actuation when said certain abnormal process change is not corrected within a specified period of time.

11. The system of claim 1 wherein said alarm display means includes means for listing component failures causing an unsuccessful automatic protective actuation as part of said information regarding unsuccessful automatic protective actuation.

12. The system of claim 1 wherein said accomplished action display means includes means displaying with each certain abnormal process change a conformation list listing actuation which completed the completed automatic protective actuation.

13. The system of claim 1 wherein said alarm display means includes means for determining that an automatic protective actuation was unsuccessful based upon an initiator element, and selectively also, based upon one or more of an applicability element, an exclusion element and a contingency element.

14. The system of claim 1 wherein said accomplished action display means includes means for determining that an automatic protective actuation was success fill based upon an initiator element, and selectively also, based upon one or more of an applicability element, an exclusion element and a contingency element.

15. An information system for operating a complex plant, said system comprising:

alarm display means displaying in parallel, information regarding an unsuccessful automatic protective actuation initiated in response to certain abnormal process changes; and accomplished action display means displaying separately from said alarm display means, information regarding another, recently completed automatic protective actuation; and wherein said complex plant comprises a plurality of components through which a process medium flows and said alarm display means displays representations of said components arranged to illustrate flow of said process medium through said components and with each certain abnormal process change displayed adjacent to an associated component.

16. An information system for operating a complex plant, said system comprising:

alarm display means displaying in parallel, information regarding an unsuccessful automatic protective actuation initiated in response to certain abnormal process changes;

accomplished action display means displaying separately from said alarm display means, information regarding another, recently completed automatic protective actuation;

an alarm queue; and an accomplished action queue; and wherein said alarm display means and accomplished action display means have limited capacities and said information is prioritized in the alarm queue and the accomplished action queue with information of highest priority in the alarm queue displayed on the alarm display means and information of the highest priority in the accomplished action queue displayed on the accomplished action display means and wherein information in the alarm queue and in the accomplished action queue of lower priority is displayed separately.

* * * * *